(12) United States Patent
Nally et al.

(10) Patent No.: US 8,387,934 B2
(45) Date of Patent: Mar. 5, 2013

(54) OVER-THE-DOOR GAME HANGER SYSTEM

(75) Inventors: Michael J. Nally, Ridgewood, NJ (US); Jim Lam Kwan Wing, Hong Kong (HK)

(73) Assignee: EastPoint Sports Ltd., LLC, Whippany, NJ (US)

( * ) Notice: Subject to any disclaimer, the term of this patent is extended or adjusted under 35 U.S.C. 154(b) by 41 days.

(21) Appl. No.: 13/046,522

(22) Filed: Mar. 11, 2011

(65) Prior Publication Data

US 2012/0228452 A1    Sep. 13, 2012

(51) Int. Cl.
*E04G 5/06* (2006.01)
*A63B 63/08* (2006.01)

(52) U.S. Cl. ............... 248/225.21; 248/205.1; 248/301; 248/317; 248/693; 211/113; 473/481

(58) Field of Classification Search ............. 248/225.21, 248/205.1, 317, 304, 693, 489; 473/483, 473/481; 211/113
See application file for complete search history.

(56) References Cited

U.S. PATENT DOCUMENTS

| | | | | |
|---|---|---|---|---|
| 2,508,527 A | * | 5/1950 | Martin et al. | 108/152 |
| 2,690,787 A | * | 10/1954 | Soltis | 297/255 |
| 3,814,359 A | * | 6/1974 | Powell | 248/99 |
| 4,715,600 A | * | 12/1987 | Offutt | 473/481 |
| 4,796,762 A | * | 1/1989 | Law | 211/64 |
| 5,224,699 A | | 7/1993 | Zaruba | |
| 5,827,136 A | * | 10/1998 | Halter et al. | 473/447 |
| 6,158,593 A | * | 12/2000 | Olsen | 211/14 |
| 7,201,676 B2 | | 4/2007 | Rumfola, III | |
| 2004/0058756 A1 | | 3/2004 | Huang | |

OTHER PUBLICATIONS

Office Playground, Inc. "Nerf Basketball Hoop—Nerfoop"; website http://officeplayground.com/Nerf-Basketball-Hoop-Nerfoop-P352.aspx; p. 1.

* cited by examiner

*Primary Examiner* — Anita M King
(74) *Attorney, Agent, or Firm* — Larkin Hoffman Daly & Lindgren Ltd.; Thomas J. Oppold (57) ABSTRACT

An over-the-door game hanger system having a pair of first and second hooks capable of receiving a top edge of a standard door. An attachment plate is removably attached between the first and second hooks. A game support strap is operably secured to the attachment plate at one end and to a game panel at the other end. A balance block may be provided which is removable mounted proximate an upper edge of the game panel. The strap is disposed to extend from the game panel over the forward end of the balance block such that the strap extends at an angle therefrom toward the attachment plate proximate the top edge of said door thereby generating a moment and a force in a direction toward the door face such that the game panel hangs substantially vertically flush against the substantially vertical door face. In an alternative embodiment wherein the balance block is used, the game support strap may be supported or secured by any means proximate a top edge of a standard door.

13 Claims, 7 Drawing Sheets

OVER-THE-DOOR GAME HANGER SYSTEM

BACKGROUND

Many games that hang from doors, such as dart boards, miniature basketball hoops, etc., have a fixed length hanger that does not provide the ability to adjust the vertical height of the game from the top of the door. Additionally, many over-the-door games tilt forward instead of remaining substantially vertical against the door face, which undesirably affects game play. Accordingly, there is a need for an over-the-door game hanger system that permits both vertical height adjustment as well as ensuring the game panel hangs on the door substantially vertically against the face of the door. There is also a need for an over-the-door hanger system that is compact and lightweight to minimize package size and shipping costs.

DESCRIPTION

Figure 1:
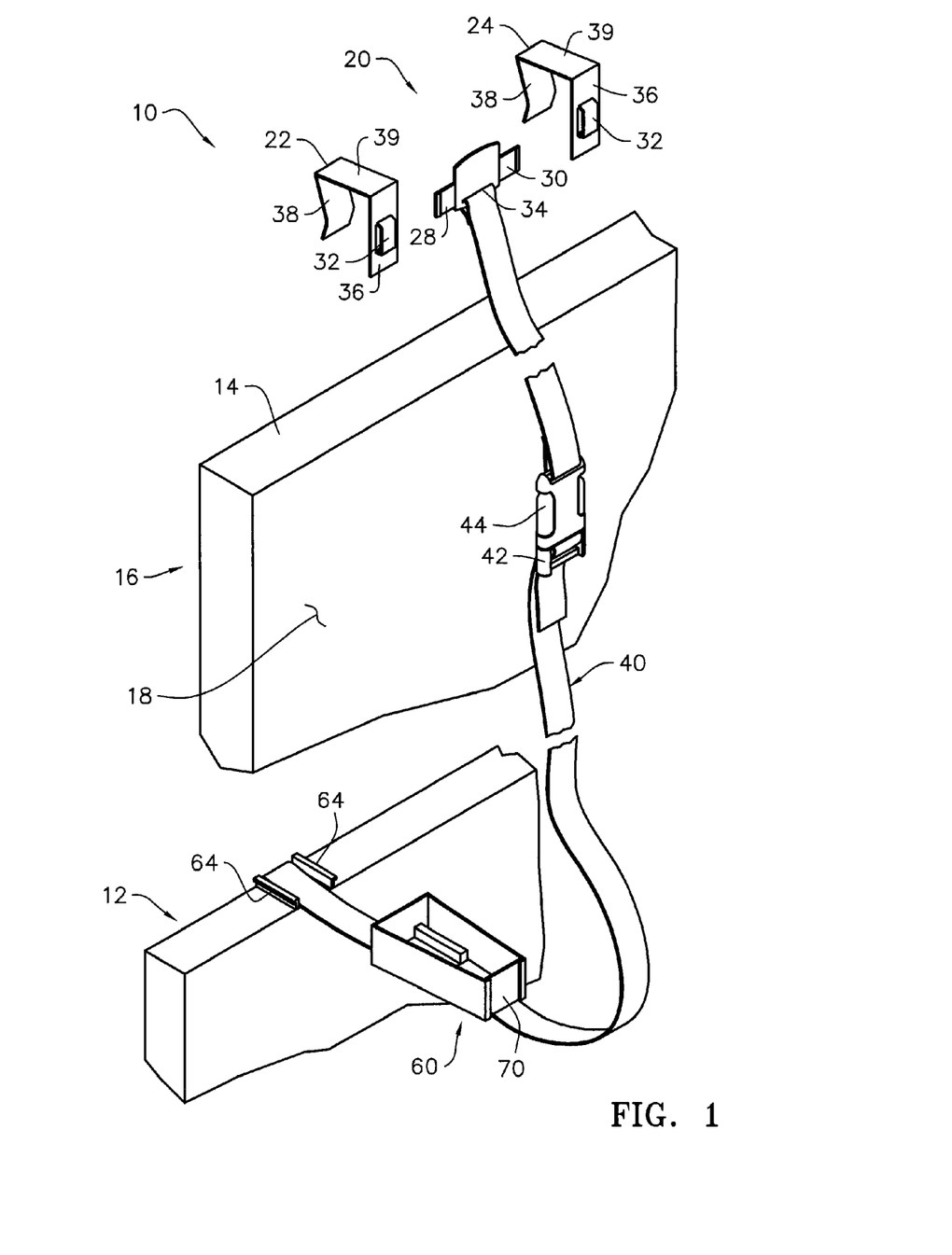
FIG. 1 is an exploded perspective view of one embodiment of a over-the-door hanger system.

Referring now to the drawings, wherein like reference numerals designate identical or corresponding parts throughout the several views, FIG. 1 illustrates one embodiment of an over-the-door hanger system 10 for adjustably hanging a game panel 12 a desired distance from the top edge 14 of a door 16 and substantially flush with the door face 18.

The hanger system 10 preferably includes a hook assembly 20 an adjustable length strap 40 and preferably a balance block 60. The hanger system 10 may be adapted to support any game panel 12 for an over-the-door game, such as a dartboard, a basketball backboard and hoop, or any other type of game that may be supported from a door. It should be appreciated that depending on the size of the game panel, one, two or more hanger systems 10 may be used to support the game panel 12 from the door.

Figure 2:
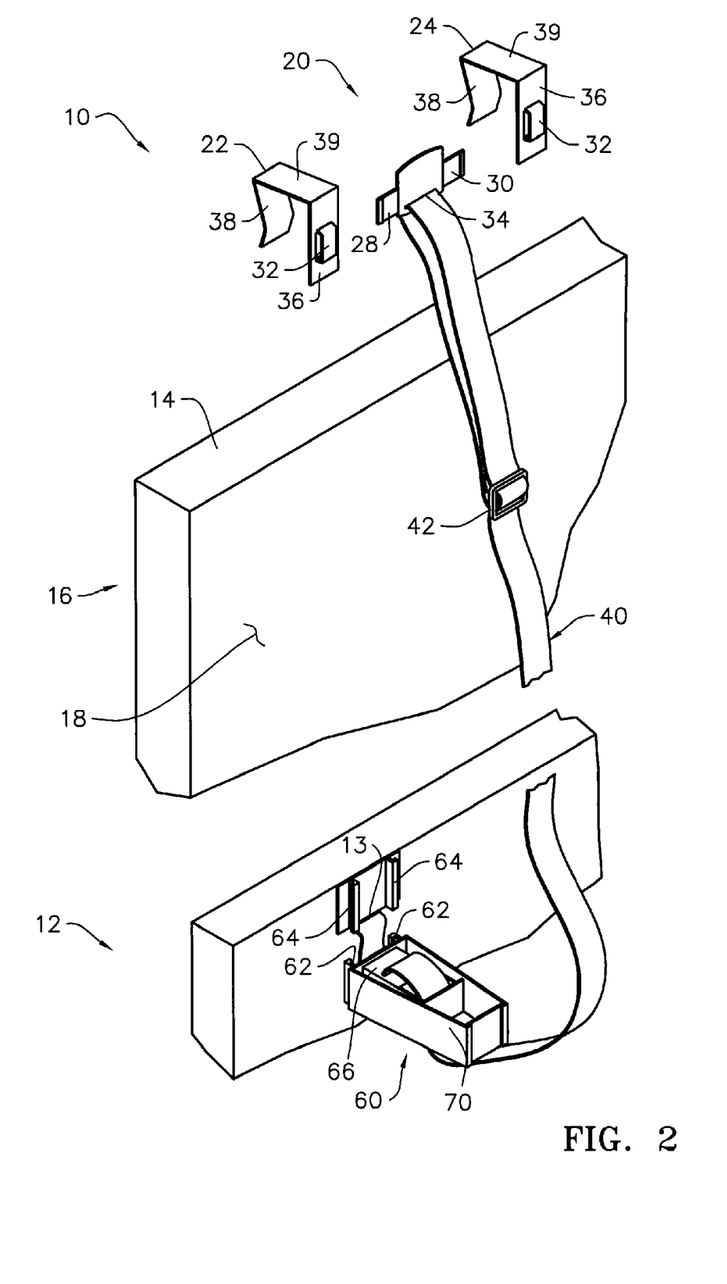
FIG. 2 is an exploded perspective view of another embodiment of a over-the-door hanger system.
Figure 3:
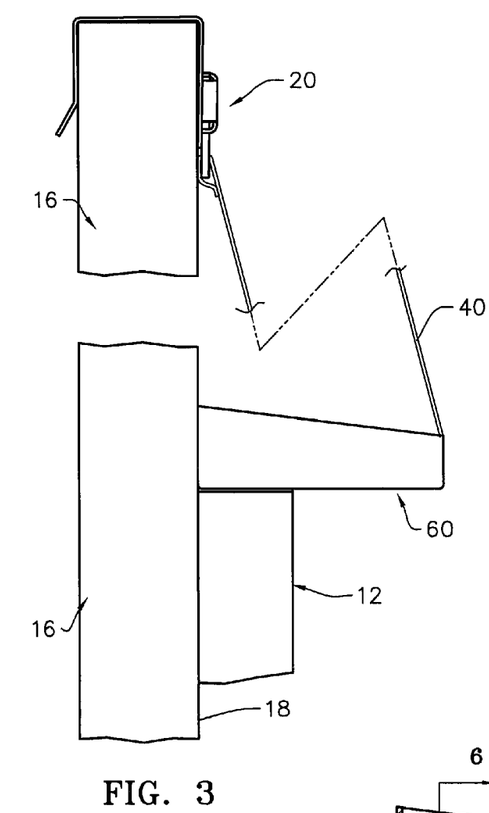
FIG. 3 is a side elevation view and partial cross-sectional view of the assembled over-the-door hanger system of FIG. 1.
Figures 4, 7, 8:
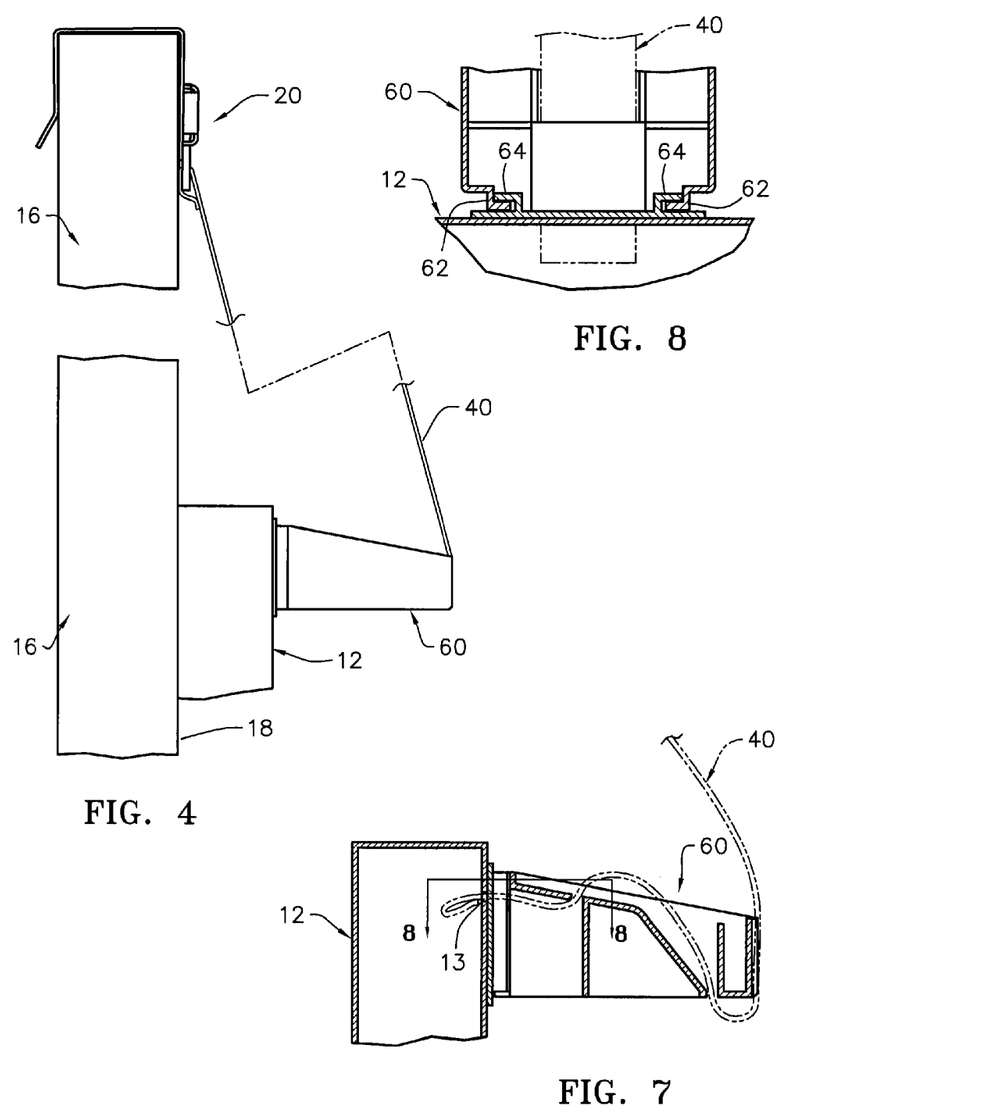
FIG. 4 is a side elevation view and partial cross-sectional view of the assembled over-the-door hanger system of FIG. 2.
FIG. 7 is an enlarged partial cross-sectional view of the balance block and game panel of FIG. 4.
FIG. 8 is a cross-sectional view of the balance block as viewed along lines 8-8 of FIG. 7.
Figure 12:
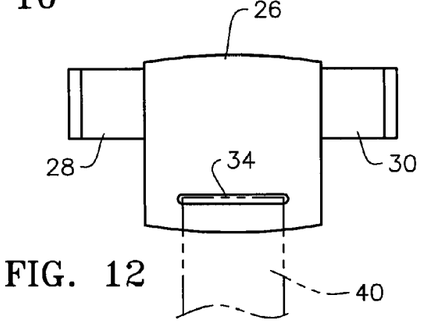
FIG. 12 is a front elevation view of one embodiment of an attachment plate for the over-the-door hanger system of FIGS. 1 and 2.
Figure 13:
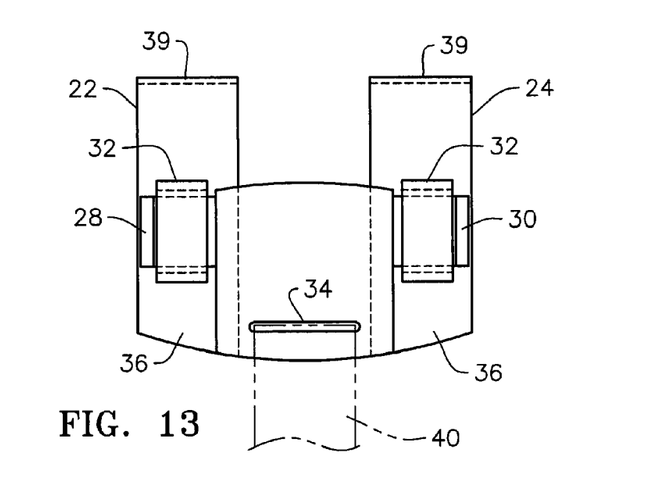
FIG. 13 is a front elevation view of the assembled over-the-door hooks and attachment plate for the over-the-door hanger system of FIGS. 1 and 2.
Figure 14:
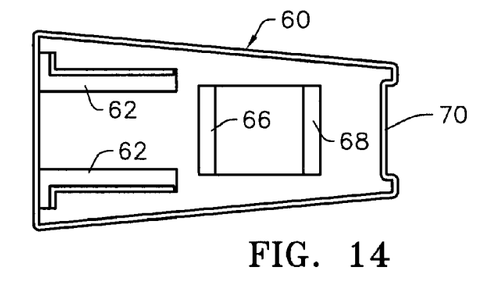
FIG. 14 is a top plan view of one embodiment of a balance block for the over-the-door hanger system of FIGS. 1 and 2.

The hook assembly 20 preferably includes first and second hooks 22, 24 and an attachment plate 26 all preferably made of plastic material or other suitably rigid yet resilient material. When assembled (see FIG. 13), the hooks 22, 24 are attached to each side of the attachment plate 26 by outwardly projecting ears 28, 30 (see FIG. 12) received within clips 32. The plate 26 includes a slot 34 for receiving one end of the strap 40. The other end of the strap 40 is secured to the game panel 12. The strap 40 preferably includes a length adjuster 42, such as a tri-glide strap adjuster (see also FIG. 2) or any other suitable strap adjustment hardware familiar to those of ordinary skill in the art. The strap adjuster 42 may be combined with a quick release connector 44 (FIG. 1) such as a side-release buckle or any other suitable connector to allow for quick and easy changing of the game panels 12 without having to remove the hook assembly 20 from the door 16. It should be appreciated that another advantage of the hook assembly 20 is that package size and shipping costs can be reduced by making the hook assembly 20 into three easily assembled components rather than fabricating it as a single piece.

Figure 10:
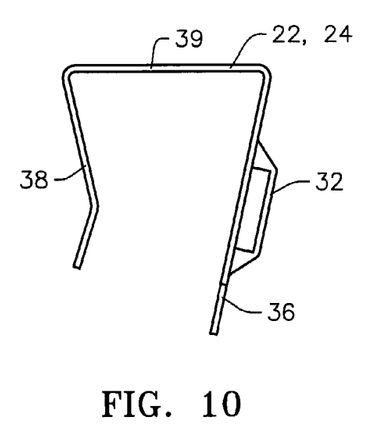
FIG. 10 is a side elevation view of one embodiment of a hook for the over-the-door hanger system of FIGS. 1 and 2.
Figure 11:
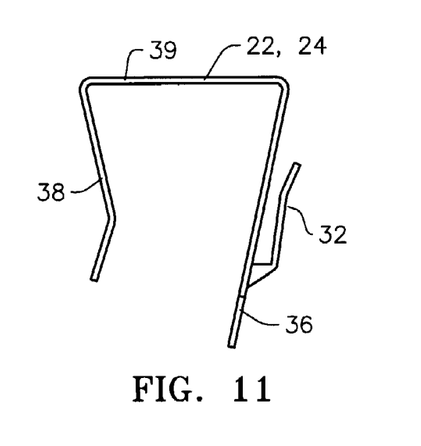
FIG. 11 is a side elevation view of another embodiment of a hook for the over-the-door hanger system of FIGS. 1 and 2.

FIG. 10 is a side elevation view of a preferred hook 22, 24. Each hook 22, 24 preferably includes a front leg 36 and a back leg 38 joined together by a top member 39. The legs are preferably angled inwardly toward one another and the top member is preferably of sufficient length to receive the widest standard residential or commercial door thickness (usually less than 2 inches). The inward angle of the resilient legs 36, 38 is sufficient to snugly receive the thinnest standard residential or commercial door thickness (usually greater than 1⅜ inches). FIG. 11 illustrates a hook with an alternative clip 32 for receiving the ears 28, 30.

Figure 5:
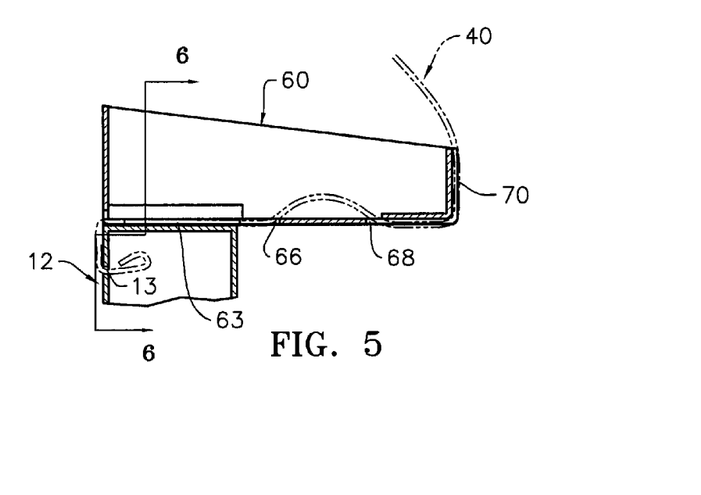
FIG. 5 is an enlarged partial cross-sectional view of the balance block and game panel of FIG. 3.
Figure 6:
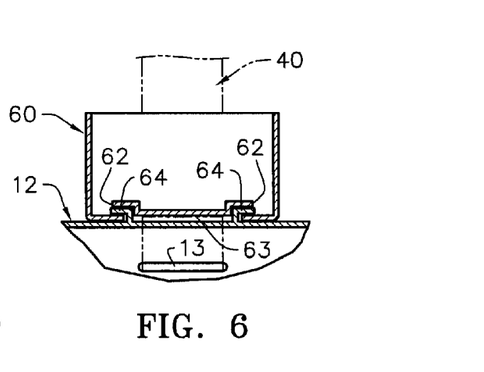
FIG. 6 is a cross-sectional view of the balance block as viewed along lines 6-6 of FIG. 5.
Figure 15:
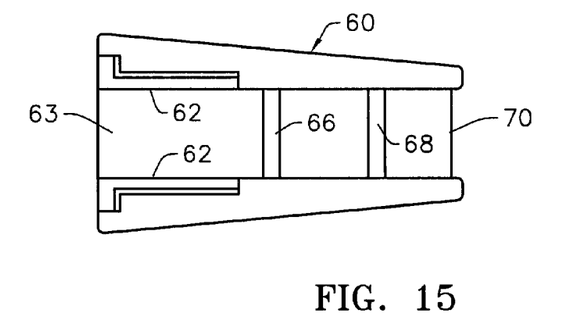
FIG. 15 is a bottom plan view of the balance block of FIG. 14.
Figure 16:
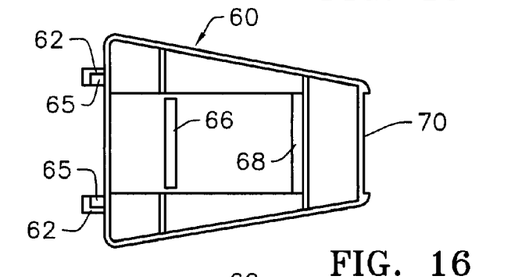
FIG. 16 is a top plan view of another embodiment of a balance block for the over-the-door hanger system of FIGS. 1 and 2.

Referring to FIGS. 1, 3, 5 and 6, the preferred hanger system 10 includes a balance block 60 that preferably removably mounts to the game panel 12 through the use of L-shaped slots 62 which slidably receive L-shaped rails 64 disposed on or near the top side of the game panel 12. When mounted to the game panel 12, the forward end 70 of the balance block 60 extends a distance forwardly of the game panel 12 and outwardly away from the substantially vertical door face 18. As best illustrated in FIG. 5 and FIG. 15, the underside of the balance block includes a recessed area 63 to allow the strap 40 to pass between the L-shaped slots 62. The end of the strap 40 is secured to the game panel 12, such as by passing through a narrow slot 13 in the back of the game panel 12 with the end folded over and stitched so it will not pull through the narrow slot 13. The strap 40 (shown in phantom lines in FIG. 5) passes under the balance block between the rails 64, then up through a first opening 66 (FIGS. 5 and 15) in the bottom wall of the balance block then down through a second opening 68. The strap 40 then extends over the recessed forward end 70 of the balance block 60 before extending toward the hanger assembly 20 at the top edge 14 of the door 16. The weight of the game panel 12 pulls the strap 40 taut and the height of the game panel can be adjusted by shortening or extending the strap 40 through the strap length adjustment 42.

Figure 17:
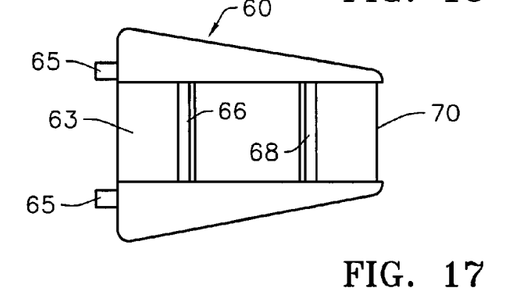
FIG. 17 is a bottom plan view of the balance block of FIG. 16.

In an alternative embodiment as shown in FIGS. 2, 4, 7 and 8, rather than the balance block mounting to the top side of the game panel 12, the balance block 60 mounts to a front face of the game panel 12. The rails 64 project from the front face of the game panel 12 which are received by mating slots 62 extending from the back side of the balance block. A bottom stop plate 65 prevents the rails 64 from sliding through the slots 62. As in the previous embodiment, the underside of the balance block 60 includes a recessed area 63 (FIG. 17) to allow the strap 40 to pass between the slots 62. The end of the strap 40 is secured to the game panel 12, such as by passing through a narrow slot 13 in the front of the game panel 12 with the end folded over and stitched so it will not pull through the narrow slot 13. The strap 40 (shown in phantom lines in FIG. 7) passes through the game panel 12 between the rails 64 and slots 62, then up through a first opening 66 (FIGS. 7 and 17) then down through a second opening 68. The strap then passes over the forward end 70 of the balance block 60 before extending toward the hanger assembly 20 at the top edge 14 of the door 16. The weight of the game panel 12 pulls the strap 40 taut and the height of the game panel can be adjusted by shortening or extending the strap 40 through the strap length adjustment 42.

Figure 9A:
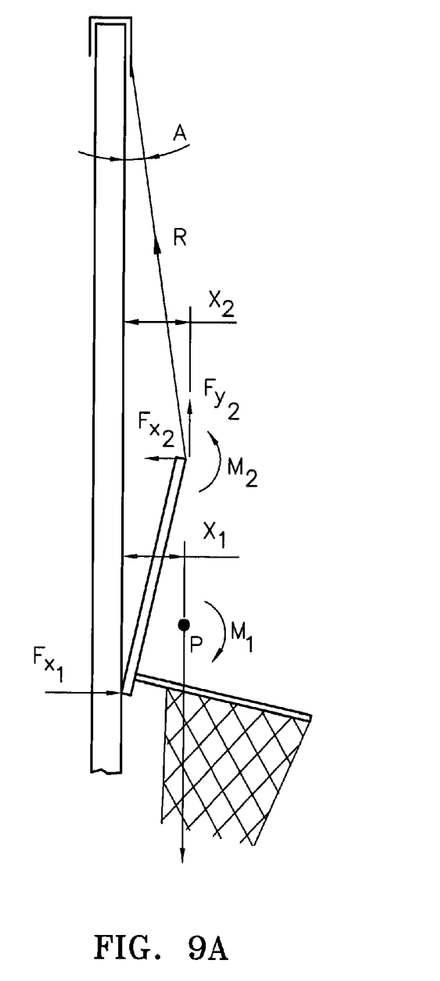
FIG. 9A is a free body diagram illustrating the forces acting on the game panel without a balance block.
Figure 9B:
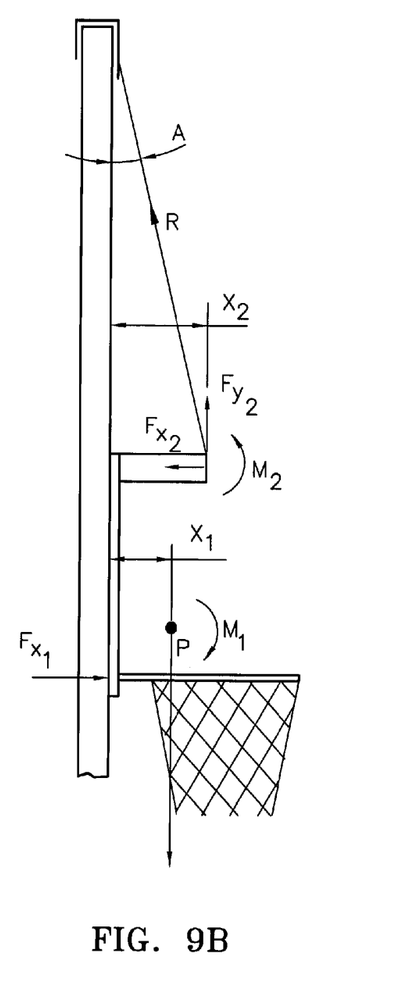
FIG. 9B is a free body diagram illustrating the forces acting on the game panel with a balance block.

FIG. 9A is a free body diagram of the game panel 12 supported by a strap 40 from the top of a door 16 by a hook assembly, without the use of a balance block. FIG. 9B is the same free body diagram but with the use of a balance block 60. Referring first to FIG. 9A, the vertical load P representing the mass of the game panel 12 is resisted by the equal but opposite force Fy. However because the center of gravity is offset a distance X1 from the hook assembly 20 a moment M1 is created causing the game panel 12 to pivot or tilt outwardly until equilibrium is achieved whereby the offset distance X2 becomes sufficient to produce an opposite moment M2 to resist the moment M1. Referring to FIG. 9B, the moment M1 is created due to the same offset distance X1 of the center of gravity of the game panel 12, but because the balance block 60 causes the strap 40 to be at a more extreme angle "A", a larger horizontal force Fx is produced and a larger moment M2 is created thereby forcing the top of the game panel 12 toward the door such that it remains substantially flush with the substantially vertical door face 18.

Based on the foregoing, it should be appreciated that the greater the length of the balance block 60, the greater the horizontal force Fx and the greater the moment M2. It has been found that a balance block between three to four inches is sufficient to maintain the game panel 12 of most over-the-door games substantially vertical and flush with the door face 18.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An over-the-door game hanger system comprising
a pair of first and second hooks capable of receiving a top edge of a standard door, said door having a substantially vertical face, each hook having a front leg;
an attachment plate extending between and removably attached to said front legs of said first and second hooks;
a game support strap having one end operably secured to said plate and another end operably secured to a game panel disposed a desired distance down from said top edge of said door; and
a balance block mounted proximate an upper edge of said game panel, said balance block having a forward end extending a distance forwardly of said game panel and outwardly away from said substantially vertical door face, said strap disposed to extend from said game panel over said forward end of said balance block such that said strap extends at an angle therefrom toward said plate proximate said top edge of said door thereby generating a moment and a force in a direction toward said door face such that said game panel hangs substantially vertically flush against said substantially vertical door face.

2. The over-the-door game hanger system of claim 1 further comprising a strap adjuster to vary the height of the game panel relative to said top edge of said door.

3. The over-the-door game hanger system of claim 1 wherein said game panel includes rails on a top side thereof and said balance block includes mating slots which slidably receive said rails.

4. The over-the-door game hanger system of claim 1 wherein said game panel includes rails on a front face thereof and said balance block includes mating slots which slidably receive said rails.

5. An over-the-door game hanger system, comprising:
a game support strap supported at a first end proximate a top edge of a standard door having a substantially vertical face, a second end of said game support strap operably secured to a game panel disposed a desired distance down from said top edge of said door;
a balance block mounted proximate an upper end of said game panel, said balance block having a forward end extending a distance forwardly of said game panel and outwardly away from said substantially vertical door face;
said strap extending from said second end over said forward end of said balance block such that said strap extends at an angle therefrom toward said first end of said strap thereby generating a moment and a substantially horizontal force in a direction toward said door face such that said game panel hangs substantially vertically flush against said substantially vertical door face.

6. The over-the-door game hanger system of claim 5 wherein said game panel includes rails on a top side thereof and said balance block includes mating slots which slidably receive said rails.

7. The over-the-door game hanger system of claim 5 wherein said game panel includes rails on a front face thereof and said balance block includes mating slots which slidably receive said rails.

8. The over-the-door game hanger system of claim 5 further comprising:
a pair of first and second hooks capable of receiving said top edge of said door;
an attachment plate removably attached between said first and second hooks, said strap first end operably secured to said plate.

9. The over-the-door game hanger system of claim 5 further comprising a strap adjuster to vary the height of the game panel relative to the top edge of the door.

10. An over-the-door game hanger system, comprising:
a pair of first and second hooks capable of receiving a top edge of a standard door, said door having a substantially vertical face;

an attachment plate removably attached between said first and second hooks;

a game support strap having a first end operably secured to said plate and a second end operably secured to a game panel disposed a desired distance down from said top edge of said door;

a balance block mounted proximate an upper end of said game panel, said balance block having a forward end extending a distance forwardly of said game panel and outwardly away from said substantially vertical door face;

said strap extending from said second end over said forward end of said balance block such that said strap extends at an angle therefrom toward said plate proximate said top edge of said door thereby generating a moment and a force in a direction toward said door face such that said game panel hangs substantially vertically flush against said substantially vertical door face.

11. The over-the-door game hanger system of claim 10 wherein said game panel includes rails on a top side thereof and said balance block includes mating slots which slidably receive said rails.

12. The over-the-door game hanger system of claim 10 wherein said game panel includes rails on a front face thereof and said balance block includes mating slots which slidably receive said rails.

13. The over-the-door game hanger system of claim 10 further comprising a strap adjuster to vary the height of the game panel relative to the top edge of the door.

* * * * *